June 20, 1961 C. L. WALLACE, JR 2,989,575
SOLAR BATTERY AND MOUNTING ARRANGEMENT
Filed Sept. 22, 1958
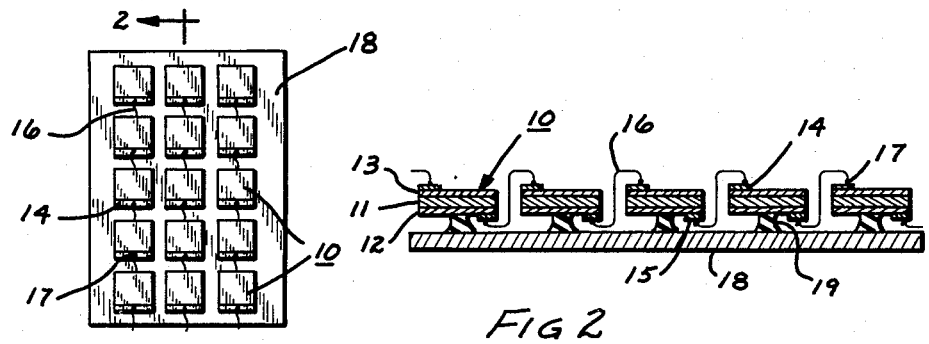
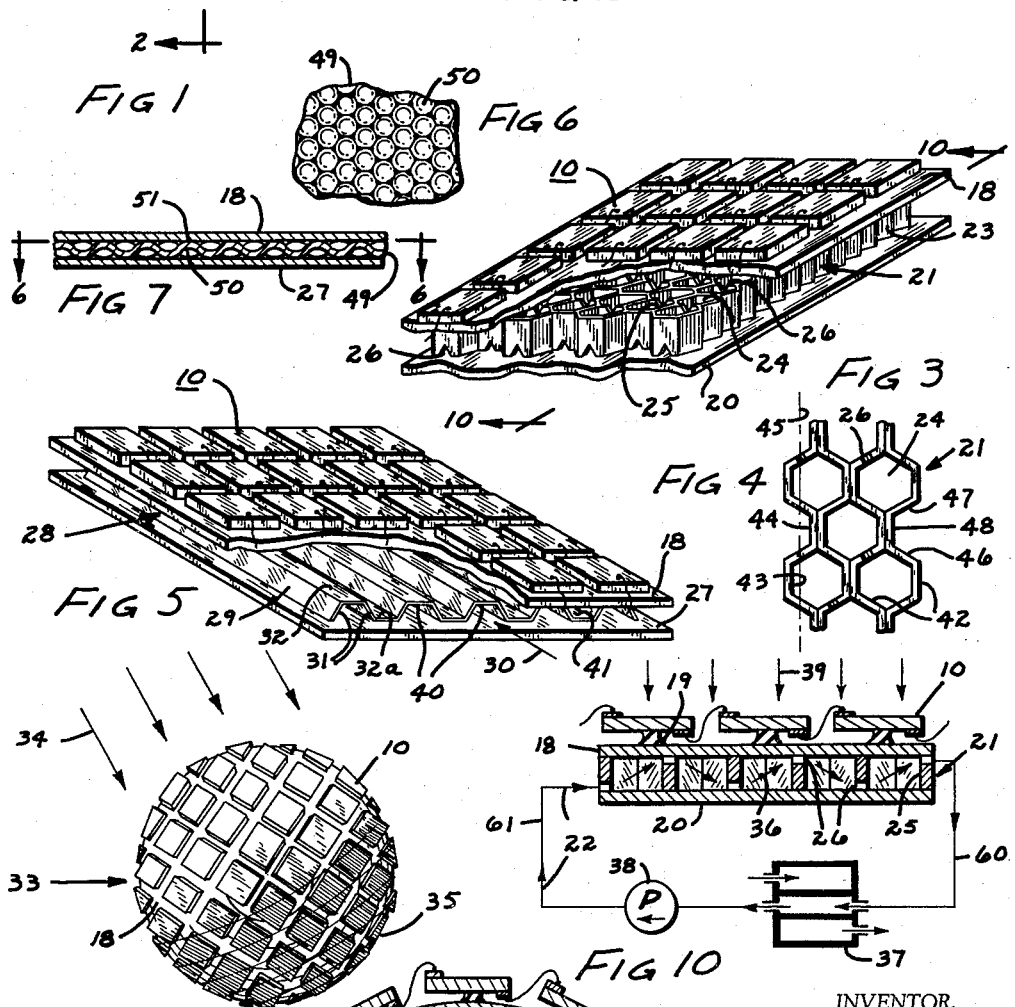
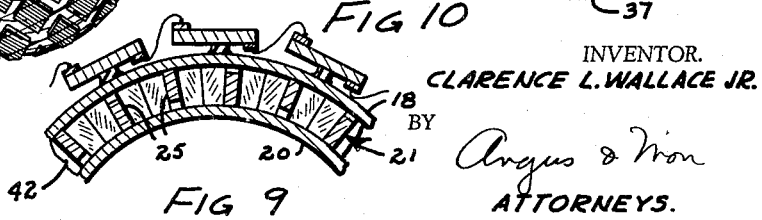
INVENTOR.
CLARENCE L. WALLACE JR.
BY
Angus & Mon
ATTORNEYS.

United States Patent Office 2,989,575
Patented June 20, 1961

2,989,575
SOLAR BATTERY AND MOUNTING ARRANGEMENT
Clarence L. Wallace, Jr., Topanga, Calif., assignor to International Rectifier Corporation, El Segundo, Calif., a corporation of California
Filed Sept. 22, 1958, Ser. No. 762,422
4 Claims. (Cl. 136—89)

This invention relates to solar cells, and more particularly to mounting arrangements of a battery of solar cells.

An object of this invention is to provide a lightweight, but very strong solar-battery mounting arrangement; a related object is to increase the operating efficiency of the solar battery by allowing the mounting assembly to be curved and thereby conduct heat away from the solar cells. A further object is to provide a mounting structure which may be readily shaped to a desired configuration, such as a sphere. A still further object is to provide for a maximum surface of exposure to sunlight of a given area.

Photovoltaic or solar cells are a well-known means of generating a voltage when energized by the sun's light rays. A photovoltaic cell commonly comprises a thin sheet or wafer of a semi-conductor material, such as a wafer cut from a silicon crystal, with a metallic coating on its base, constituting a terminal of the cell. On the opposite side of the cell, facing to the sunlight, there is provided an active layer or area sensitive to the sunlight which may for example be provided by diffusing boron into the surface of N-type silicon to create the well-known P-N junction where the action of the sunlight generates a voltage in a well-known manner. Ordinarily each cell of this type develops only a very small potential; but a battery can be formed from a plurality of such cells to provide desired voltage and current characteristics by connection of these cells in series of parallel arrangements.

Solar batteries are useful as a D.C. voltage supply for charging storage batteries, for operating resistive loads, or for other purposes, and are particularly useful in satellites or missiles, where the conservation of weight and space are of the utmost importance. Satellites have heretofore been equipped with solar batteries which have been placed within the outer shell of the satellite and the light has been allowed to enter the shell and strike the cells through windows in the shell. For use in missiles and satellites, as well as for other purposes, it is desired to have the weight of the cell mounting as small as possible.

It is well known that the operating efficiency of the solar cell conversion of light energy to electrical energy decreases as the solar cell surface temperature increases. The steady state temperature of a solar cell exposed to a radiant source is a function of energy content of the incident radiation upon the cell and the ability of the cell supporting structure to conduct the heat away. In the case of a satellite or a missile it is of prime importance that the heat be conducted away so that the solar batteries may function properly. Since there is only a negligible amount of matter surrounding a missile or a satellite during its flight, the heat absorbed by these cells cannot be dissipated by conduction to a surrounding media, but must be transported internally to a heat sink.

In accordance with my present invention, the several solar cells of a solar battery are mounted on a heat-conducting plate. The cells are placed side by side so that they substantially cover the surface area of the plate, while allowing such spacing between cells as may be desired for electrically separating one cell from another.

In accordance with a preferred feature, the said plate is spaced from a second plate in such a manner as to allow a cooling fluid, either liquid or gaseous, to flow between them, thereby absorbing heat from the immediate vicinity of the solar cells and conveying it to a suitable heat sink, from where it can be dissipated by radiation.

In accordance with a feature of the invention, the space between the plates accommodates a baffle arrangement to control the flow characteristics of the cooling fluid. The baffle acts as a spacer between the two said plates, and in combination they create a very strong and rigid support for the battery of cells.

According to one preferred feature, the baffle construction is in the form of a honeycomb between the two plates. According to an alternative feature, the baffle is in the form of a truss between the two plates.

A mounting arrangement according to this invention results in the solar battery being operated at lower surface temperatures and consequently at higher efficiency than would be possible by standard or current techniques with a similar weight per unit area.

The presence of the battery of solar cells attached to the outer surface of the top plate exposes them to the sunlight without the necessity of providing additional housing for the array; and the cell-supporting structure itself may provide a housing for a missile, satellite or other purpose.

The foregoing and other features of the invention will be more fully understood from the following detailed description and the accompanying drawings of which:

FIG. 1 is a plan view of a plate having solar cells mounted thereon;

FIG. 2 is a cross-section view taken at line 2—2 of FIG. 1;

FIG. 3 is an isometric view of a solar battery mounting arrangement according to this invention, the arrangement including the structure of FIGS. 1 and 2 shown partly cut away to expose the "honeycomb" baffle arrangement;

FIG. 4 is a plan view of a segment of the "honeycomb" baffle arrangement to illustrate a method of manufacture of said baffle arrangement;

FIG. 5 is an isometric view of another solar battery arrangement according to this invention, the top plate being partly cut away to expose the "cored" baffle arrangement;

FIG. 6 is a plan view of a dimpled plate which may be used in a solar battery mounting arrangement according to this invention;

FIG. 7 is a cross-section view of a solar battery mounting arrangement using the dimpled plate of FIG. 6;

FIG. 8 is a view in elevation of a sphere such as a satellite, on which is mounted a battery of solar cells according to this invention;

FIG. 9 is a cross-section view of part of the sphere shown in FIG. 8 which has a honeycomb baffle arrangement; and FIG. 10 is a cross-section view taken at line 10—10 of FIG. 3, including an illustration of heat transfer from the solar cells.

Referring to the drawing, FIG. 1 shows a plan view and FIG. 2, a cross-section view of a plurality of solar cells 10 mounted on a plate 18. The solar cells 10 may be of a well-known type, comprising a flat wafer 11 of semi-conductor material, commonly cut from a crystal such as silicon. The base surface is coated with a suitably electrically conducting coating 12 such as nickel plate as by the well-known chemical plating process known as "electrodeless plating," and the upper or active surface is treated with a suitable doping substance, which may be, for example, boron, when the silicon crystal is N-type. The boron may be applied in a well-known manner as for example by passing boron trichloride over the N-type silicon while the silicon is hot. This treatment will cause boron to diffuse into the silicon with the result that a P-N junction will form just beneath the silicon surface which is thus doped with the boron. The boron doped silicon at the surface will be P-type and the silicon beneath the junction will be N-type. The boron doped layer 13 resulting from the treatment will be very thin, for example about 0.0001 inch thick or less and will easily allow the sunlight to pass through to the P-N junction beneath. This action of light at the P-N junction results in the generation of D.C. voltage between the P-type and N-type silicon in a well-known manner.

It will be understood that in each of the figures the thickness of each cell relative to its surface area has been exaggerated for the purpose of illustrating the cell and its constituents. The cells will be thinner in relation to their areas than those which appear in the drawing; and the cells will ordinarily be thinner in relation to plate 18 than appears in FIG. 2. It will also be understood that the solar cells need not have square or rectangular upper and lower surfaces as shown in the drawings, but may be of any desired configuration.

In order that the battery of cells may be electrically interconnected to each other, thereby producing a larger voltage than is obtainable from a single cell, suitable contacting means is provided for each cell. Each contacting means comprises two strips of conducting material 14 and 15, for example, copper or nickel, which may be plated over the boron doped silicon layer 13 and the nickel base coating 12 respectively, in order that they may serve as suitable bases for soldering connections. An electrically insulated lead 16 is soldered at 17 to the contact strip 14 on the boron layer of a cell to the contact strip 15 on the nickel coating of an adjacent cell. Each of the cells 10 of the battery may be connected in the aforementioned manner to generate a much larger voltage than obtainable from an individual cell.

The cells are attached to a plate 18 by an attachment means which is an electrical insulator and a heat conductor. The means of attachment may be a suitable cement or resin or the like 19 such as an epoxy resin. It may be applied to either the plate 18 or the nickel coating 12 of the solar cell in such a manner as to build a cementitious or resinous lump before the cell is mounted on the plate. The lump may be made large enough to allow space for the electrical lead 16 and its soldered connection 17 to the contact strip 15, all of which are located under the solar cell. If the plate is electrically conducting, such as metal, the cement should be of an electrically insulating type. It will be understood, furthermore, that the thickness of the cement is shown exaggerated in FIG. 2; and in fact the cement or resin may be made quite thin, and may if desired cover all, or substantially all, of the surfaces 12.

Fig. 3 shows the solar cells 10 mounted on the plate 18 which is supported on top of a honeycomb structure arranged for providing cooling. In this arrangement, the plate 18 is referred to as a top plate. The top plate has been partly cut away to expose the cooling apparatus. The cooling apparatus comprises a bottom plate 20 spaced from the top plate 18 to create a passageway for cooling fluid to flow through the "honeycomb" baffle arrangement 21. The honeycomb baffle arrangement 21 comprises a sheet of relatively thick metal or plastic or other material 23 which is porous to provide paths for passage of fluid through the baffle arrangement, yet strong enough to provide a rigid support between the top plate 18 and the bottom plate 20. The porosity is due to a plurality of holes 24 extending through the thickness of the material 23. The holes may be of a circular or polyhedral configuration, and oriented with respect to each other so that a wall 25 is of substantially identical configuration to all other walls 25 separating any two adjacent holes 24. In the case of a plurality of polyhedral holes, and more particularly hexagonal holes as shown in FIG. 3, the holes 24 are oriented with respect to each other so that the wall 25 is of substantially uniform thickness and identical configuration to all other walls 25 separating any two adjacent holes 24.

A coolant fluid such as hydrogen gas is preferably provided to aid in conducting heat away from the vicinity of the solar cells. When the gas is used, it is contained within the honeycomb cellular structure. In order to contain the gas, the external walls of the cellular structure are completely closed. At least some of the internal walls 25, however, are provided with ports or passageways 26, so that each cell is in communication with another, to allow the fluid to flow throughout the honeycomb structure by circulation from cell to cell through the ports. The ports 26 may be small notches located at or near the top or bottom of the honeycomb walls, and preferably the notches alternate from top to bottom through the successive walls 25. Since there are no such notches in the outer walls of the structure located around the periphery of the honeycomb, the coolant fluid cannot escape. By this arrangement, the heat at the cells can be conducted through the honeycomb structure toward the lower plate 20 not only by conduction through the material of the honeycomb, but also by conduction in the coolant fluid. When one part of the structure is subjected to sunlight, while another part is not so subjected, the heat can similarly be conducted from the hot part to the cooler part of the structure which acts as a heat sink, from where it can be radiated and thus dissipated.

Fig. 4 shows a top or plan view of the honeycomb baffle arrangement 21 as illustrated in Fig. 3. A recommended procedure for the fabricating of the said honeycomb arrangement, having hexagonal holes 24, is to indent a channel, by pressing, into both sides of a plurality of flat sheet metal strips 42 which have a width equal to the desired spacing between the top plate 18 and the bottom plate 20. These channels extend across each strip in a direction substantially parallel with the width of the sheet metal strip. The indented channels are separated into two groups, 43, 44, each group being alternately intermixed with the other and on opposite sides of the metal strip 42 and extending in opposite directions normal to a medial plane 45 of the metal strip. Each channel comprises two converging side walls 46, 47, and a top wall 48. The top wall lying in a plane substantially parallel with the medial plane 45 of the metal strip makes an angle at the interface with each side wall of 120 degrees, thereby providing half the required wall surface for each hexagonal hole.

The honeycomb baffle arrangement is then assembled by fastening a plurality of the channeled sheet metal strips together to form hexagonal holes within the arrangement. Fastening means may be by spot welding, cementing, soldering, or the like, the top walls of each metal strip to the respective top wall of an adjacent channeled strip.

The ports or notches 26 may then be cut at the desired locations as described in FIG. 3.

FIG. 5 shows another type of mounting arrangement which also can support the solar cells 10 mounted on the top plate 18, and provide cooling. The top plate has again been cut away to expose the cooling apparatus. As in the case of the structure of FIG. 3, the mounting and cooling apparatus comprises a bottom plate 27 spaced from the top plate 18 to create a passageway for a coolant fluid to flow, and a "truss cored" baffle arrangement 28 is provided in the passage in contact with said top plate and said bottom plate. The truss cored baffle arrangement 28 comprises a single flat sheet 29 of metal or plastic or other material which is pressed or molded, as the case may be, thereby channeling or corrugating the sheet. The sheet member 29 has a plurality of two groups of indentations or channels 40 and 41, the cross-section of which is in the form of an equilateral trapezoid extending throughout the entire length of the sheet along the direction of flow of cooling fluid as denoted by arrow 30, and covering the entire surface of the sheet. Each group of indentations 40 and 41 being alternately intermixed with the other group extend in opposite directions into the sheet and normal to a medial-plane of the sheet 29. Each indentation or channel comprises two converging side walls 31 and also a top wall 32 and bottom wall 32a which are substantially parallel to the medial plane of the sheet. The term "medial plane" as used herein means an imaginary plane midway between surfaces 32 and 32a. The indentations need not be in the form of an equilateral trapezoid but may be of any configuration which will serve the purpose of allowing the passage of fluid through the cooling arrangement in a substantially unidirectional flow, and capable of providing a rigid support between the top plate 18 and the bottom plate 27.

For purpose of cooling, the coolant fluid, for example the gas, can be contained within the truss structure; and for this purpose, the ends of the truss structure shown open in FIG. 5 will be closed by any suitable means (not shown). By this arrangement, the coolant fluid can move and flow in a manner somewhat similar to that described in connection with FIG. 3, to help carry heat away from hot portions of the structure toward cooler portions of the structure which act as a heat sink, from where it can be dissipated.

FIGS. 6 and 7 show another means for containing the cooling fluid between the top plate 18 and the bottom plate 27. The top and bottom plates are spaced from each other by a thin metal sheet 49 which is dimpled at 50 over its entire surface on one side. The dimples, or small indentations extending into the surface of the metal sheet are centrally spaced from each other on the surface of the sheet at equal distances apart. The dimples have a spherical configuration and produce an indentation into the metal sheet which has a diameter greater than the said spacing between adjacent indentations. The dimples 50 have an effect upon the metal sheet 49 such that the surface of the sheet opposite the side of the dimpled indentations protrudes 51 away from the surface of the sheet. The combined effect of the dimpled configuration and the protrusions on the opposite side allow a cooling fluid to be contained and to pass between the top and bottom plates 18, 27.

FIG. 8 shows a sphere 33, comprising a top plate 18, which acts as the outer surface of the sphere which may be provided with a cooling arrangement (not shown) of any of the types described hereinabove situated directly beneath the top plate. A plurality of solar cells 10 are electrically connected (not shown) and mounted onto the top plate in the previously described manner. The sphere may be located in space, as a satellite or part of a missile, and in the presence of sunlight 34. The sunlight 34 contains light and heat energy and illuminates the surface of the solar cells on the half surface of the sphere 33 facing the sun, thereby creating a voltage and at the same time creating heat at the cells, which it is desired to dissipate. The sphere 33 is considered to be a closed hydraulic circuit, whereby the heat is absorbed by the cells and transmitted to the cooling fluid between the top and bottom plates. The fluid, by natural convection, distributes the heat throughout the entire cell supporting structure including the shadowed side 35 of the sphere. The shadowed side, being cooler than the illuminated side because no direct heat rays strike it, absorbs more of the heat from the fluid thereby creating a more uniform heat distribution throughout the structure.

When the sphere is made up of a mounting structure of any of the types previously described, the entire structure between the top and bottom plates may carry the coolant fluid. For example, if the structure of the sphere is made of a honeycomb type such as that of FIG. 3, there need be no solid outside walls of the honeycomb having no notches. Instead, the notching of the walls may be made uniform throughout the structure of the sphere so that there is a complete path for the flow of the coolant fluid all around the sphere, while the spherical construction itself will serve to prevent escape of the fluid. This same expedient may be followed in case the structures of FIG. 5 or 7 are used to make up the sphere, that is, there will be no necessity to block the flow of coolant fluid at any point. Instead it may simply be allowed to flow completely around the sphere, between the top and bottom plates, that is, the inner and outer walls in the case of the sphere.

FIG. 9 shows a cross-sectional view of a part of the sphere shown in FIG. 8 employing a honeycomb baffle arrangement 21 in the cell supporting structure. The stop plate 18 and the bottom plate 20 are each formed into a sphere, as by welding, with the honeycomb arrangement in between. The walls 25 of the baffle converge upon each other from the top plate to the bottom plate such that their extensions, if present, would meet at the center of the sphere. The fabrication of the metal strips 42 in this case may be such as to curve their ends to conform with the top and bottom plates.

It should be understood that in the arrangements of FIGS. 8 and 9, there will ordinarily be many more solar cells than are shown in these figures.

FIG. 10 shows another means of cooling the solar cells 10 and also shows more clearly the details of the honeycomb cooling baffles as shown in FIG. 3. It should be pointed out, however, that any of the types of cooling baffles described above may be used. The solar cells 10 are mounted to a top plate 18 by a suitable cement 19, and a bottom plate 20 is spaced from the top plate by the honeycomb baffle arrangement 21. The walls 25 of the baffle arrangement are cut by notches 26 at the top or bottom, alternately, of each successive wall which is perpendicular to the direction of fluid flow 22. Arrows 36 denote paths of circulation of the fluid through the baffle arrangement.

The fluid leaves the baffle arrangement 21 and flows through a suitable conduit 60 shown substantially in single line form, into a heat exchanger 37 where the fluid may dispose of its absorbed heat from the solar cells. A pump 38 may be provided to relay the cooled fluid through a conduit 61 from the heat exchanger 37 back into the baffle arrangement 21 to absorb more of the heat collected by the solar cells from the sunlight 39.

It will be recognized that the arrangement of FIG. 10 is shown schematically to indicate how coolant fluid may be caused to flow through any configuration of cooling structure according to this invention. It may be used either with a sphere or a cylinder or a flat type of structure. Ordinarily in the case of spherical-type structures and the like, as commonly used for satellites, a pump need not be provided. The normal fluid flow from the hot side to the cool side of the structure will usually serve to carry away the heat.

It will be recognized that the invention may be used in any of a number of configurations and is not limited to flat structures, nor to spherical structures. Other geometrical shapes will suggest themselves to those skilled in the art, such as cylindrical or conical structures and the like; and the mounting arrangements shown herein are applicable to all of them. In the case of cylindrical or conical structures, the transverse cross-section will appear substantially as indicated by FIG. 9.

This invention is not to be limited to the detailed description and illustrations except in accordance with the scope of appended claims.

What is claimed is:
1. A mounting means for a plurality of solar cells; said mounting means comprising first and second heat conductive plates and a spacing and securing means spaced between said first and second plates and holding said first and second plates in spaced parallel relation with respect to one another to form a low mass high strength structure; said plurality of solar cells being mounted over said first plate and being disposed over a predetermined surface portion of said first plate; said solar cells being in thermal connection with respect to said first plate; said first and second plates enclosing a spatial volume; a heat conductive gas; said heat conductive gas being sealed within said spatial volume and conducting heat between said first and second plates.

2. The device of claim 1 wherein said gas is hydrogen.

3. The device of claim 1 wherein said spacing and securing means includes a sheet metal structure defining cellular spaces in communication with one another.

4. The device of claim 1 wherein said first and second plates are spherically shaped.

References Cited in the file of this patent

UNITED STATES PATENTS

| | | |
|---|---|---|
| 1,289,369 | Berglund | Dec. 31, 1918 |
| 2,428,537 | Veszi et al. | Oct. 7, 1947 |

FOREIGN PATENTS

| | | |
|---|---|---|
| 331,022 | Switzerland | Aug. 15, 1958 |

OTHER REFERENCES

General Electric Review, April 1946, pp. 27–28.